United States Patent
Cao et al.

(10) Patent No.: US 11,359,993 B2
(45) Date of Patent: Jun. 14, 2022

(54) PULSE TESTING METHOD AND DEVICE, TESTING APPARATUS, AND STORAGE MEDIUM

(71) Applicant: ZTE Corporation, Shenzhen (CN)

(72) Inventors: Xiaojian Cao, Shenzhen (CN); Yunpeng Xie, Shenzhen (CN); Zhimin He, Shenzhen (CN); Haowen Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/257,290

(22) PCT Filed: Jul. 15, 2019

(86) PCT No.: PCT/CN2019/096026
§ 371 (c)(1),
(2) Date: Dec. 30, 2020

(87) PCT Pub. No.: WO2020/011274
PCT Pub. Date: Jan. 16, 2020

(65) Prior Publication Data
US 2021/0231525 A1    Jul. 29, 2021

(30) Foreign Application Priority Data
Jul. 13, 2018 (CN) .......................... 201810772464.2

(51) Int. Cl.
*G01M 11/00* (2006.01)
(52) U.S. Cl.
CPC ........ *G01M 11/3145* (2013.01); *G01M 11/33* (2013.01)

(58) Field of Classification Search
CPC .. G01M 11/30; G01M 11/31; G01M 11/3109; G01M 11/3145; G01M 11/3154;
(Continued)

(56) References Cited

U.S. PATENT DOCUMENTS

| | | | | |
|---|---|---|---|---|
| 5,069,544 A | * | 12/1991 | Buerli | G01M 11/3145 356/73.1 |
| 5,528,356 A | * | 6/1996 | Harcourt | G01M 11/3136 356/73.1 |
| 5,621,517 A | * | 4/1997 | Jezwinski | G01M 11/3127 356/73.1 |

(Continued)

FOREIGN PATENT DOCUMENTS

| CN | 1278639 A | 1/2001 |
|---|---|---|
| CN | 1552063 A | 12/2004 |

(Continued)

OTHER PUBLICATIONS

International Search Report and Written Opinion for the International Patent Application No. PCT/CN2019/096026 dated Oct. 14, 2019.

(Continued)

*Primary Examiner* — Gordon J Stock, Jr.
(74) *Attorney, Agent, or Firm* — Vivacqua Crane, PLLC

(57) ABSTRACT

A pulse testing method and device, a testing apparatus, and a storage medium are disclosed, the pulse testing method includes: performing a pulse test on an optical fiber by using a plurality of pulses of different pulse widths respectively to obtain test data; and fitting the test data corresponding to the plurality of pulses of different pulse widths.

10 Claims, 10 Drawing Sheets

(58) Field of Classification Search
CPC ......... G01M 11/3163; G01M 11/3172; G01M 11/3181; G01M 11/319; G01M 11/33
USPC ...................................................... 356/73.1
See application file for complete search history.

(56) References Cited

U.S. PATENT DOCUMENTS

| | | | | |
|---|---|---|---|---|
| 5,708,500 | A * | 1/1998 | Anderson | G01M 11/3145 |
| | | | | 250/227.15 |
| 5,963,313 | A * | 10/1999 | Anderson | G01M 11/3145 |
| | | | | 356/73.1 |
| 6,339,579 | B1 | 1/2002 | Kamioka et al. | |
| 9,212,969 | B2 * | 12/2015 | Levin | H04B 10/071 |
| 9,752,955 | B2 * | 9/2017 | Gurusami | G01M 11/3109 |
| 10,101,240 | B1 * | 10/2018 | Bonche | G01M 11/3145 |
| 10,107,714 | B2 * | 10/2018 | Xu | H04B 10/071 |

FOREIGN PATENT DOCUMENTS

| | | |
|---|---|---|
| CN | 1645487 A | 7/2005 |
| CN | 1674108 A | 9/2005 |
| CN | 101197140 A | 6/2008 |
| CN | 101315797 A | 12/2008 |
| CN | 103344191 A | 10/2013 |
| EP | 0453176 A2 | 10/1991 |
| EP | 0991060 A2 | 4/2000 |
| EP | 1134572 A1 | 9/2001 |
| JP | 2007292503 A | 11/2007 |

OTHER PUBLICATIONS

EPO, Supplementary European Search Report, Application No. EP19834898.9, dated Jul. 30, 2021.

* cited by examiner

PULSE TESTING METHOD AND DEVICE, TESTING APPARATUS, AND STORAGE MEDIUM

CROSS-REFERENCE TO RELATED APPLICATION

This application is a national stage filing under 35 U.S.C. § 371 of international application number PCT/CN2019/096026, filed Jul. 15, 2019, which claims priority to Chinese patent application No. 201810772464.2, filed Jul. 13, 2018. The contents of these applications are incorporated herein by reference in their entirety.

TECHNICAL FIELD

The present application relates to, but is not limited to, the field of optical fiber testing, for and more particularly, to a pulse testing method and device, a testing apparatus, and a storage medium.

BACKGROUND

Optical Time Domain Reflectometer (OTDR) is an instrument that measures an optical fiber by using the scattering of light as it travels through the optical fiber.

The OTDR emits a test beam from a test port and simultaneously tests a reflected or scattered beam formed by the test beam. 2L=V*t, where t is a time interval between an emission time and a detection time, and V is a propagation velocity of the test beam. According to the detected optical power and other parameters, condition information about the optical fiber at a distance L from the test port can be determined. For example, structural losses caused by various structural defects of the optical fiber, once occurred, will cause large fluctuations in the detected optical power. The greater the dynamic range of the OTDR is, the longer the optical fiber may be measured by the OTDR. However, due to the limitations imposed by hardware circuits, a greater identifiable testing range often leads to scattering saturation at a proximal end. In order to expand the dynamic range of the OTDR and solve the scattering saturation at the proximal end, related technologies mainly adopt the following methods.

In a first method, the OTDR performs both proximal and distal tests by emitting different laser power, and then restores complete test information by fitting. In this scheme, a hardware circuit is required to control the optical power.

In a second method, the OTDR performs tests in different amplification branches by using a same pulse width, and then restores the complete test information by fitting. This testing method is relatively simple, but requires support from different hardware amplification branches.

In a third method, the OTDR suppresses Fresnel reflections in different frequency bands by adopting different amplification branch methods, and then performs time domain conversion on different frequencies. This scheme requires support from high-performance filter circuits and has high requirements on hardware design.

In a fourth method, the OTDR adopts an OTDR coherence technology, which expands the dynamic range by improving the test capability and accuracy at a distal end. In this scheme, the light source should meet higher requirements and is costly.

No matter which method is adopted to expand the dynamic range of the OTDR, it is highly dependent on the hardware, and requires major modifications to the apparatus itself, which is difficult and costly.

SUMMARY

Some embodiments of the present application provides a pulse testing method and device, a testing apparatus and a storage medium, which at least solve a part of the above problems.

A first aspect of the present application provides a pulse testing method, which includes: performing a pulse test on an optical fiber by using a plurality of pulses of different pulse widths respectively to obtain test data; and fitting the test data corresponding to the plurality of pulses of different pulse widths.

A second aspect of the present application provides a pulse testing device, which includes: a testing module, which is configured to perform a pulse test on an optical fiber by using a plurality of pulses of different pulse widths respectively to obtain test data; and a fitting module, which is configured to fit the test data corresponding to the plurality of pulses of different pulse widths.

A third aspect of the present application provides a testing apparatus, which includes: a memory in which a computer program is stored, and a processor; the processor is connected with the memory and configured to perform the pulse testing method provided in one or more of the foregoing technical schemes by executing the computer program.

A fourth aspect of the present application provides a computer storage medium in which a computer program is stored, the pulse testing method provided in one or more of the foregoing technical schemes is performed after the computer program is executed.

According to the pulse testing method and device, the testing apparatus and the storage medium provided by some embodiments of the present application, in order to expand the testable dynamic range of the testing apparatus, it is no longer necessary to make modifications to the hardware circuit of the testing apparatus to increase the emission power of a single test pulse or adjust the frequency of the laser beam for emitting the pulses, but rather to emit the pulses of different pulse widths several times and fit the test data thereof. Firstly, the dynamic range is expanded, secondly, a test range of a narrow pulse is used to cover a scattering saturation range at the proximal end during a wide pulse test, which apparently avoids the scattering saturation at a proximal end caused by the testing apparatus with a large dynamic range at the same time, thereby also having the characteristic of good test effect, and thirdly, the tests are performed by using the pulses of different pulse widths to obtain the test data of an optical fiber to be measured. The overall scheme is simple, with low dependence on hardware and high cost performance.

DETAILED DESCRIPTION

The technical schemes of the present application will be described with reference to the accompanying drawings and some embodiments.

Figure 1:
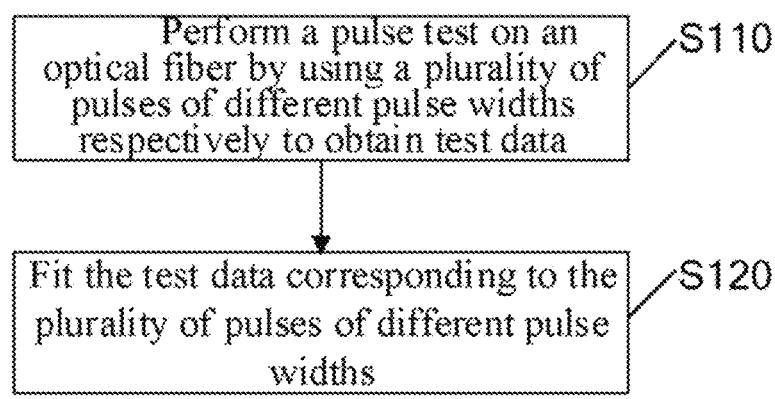
FIG. 1 is a flow diagram of a first pulse testing method provided in an embodiment of the present application.

As shown in FIG. 1, a pulse testing method is provided in the present example, including the following steps.

In a step of S110, a pulse test is performed on an optical fiber by using a plurality of pulses of different pulse widths respectively to obtain test data.

In a step of S120, the test data corresponding to the plurality of pulses of different pulse widths are fitted.

Figure 2:
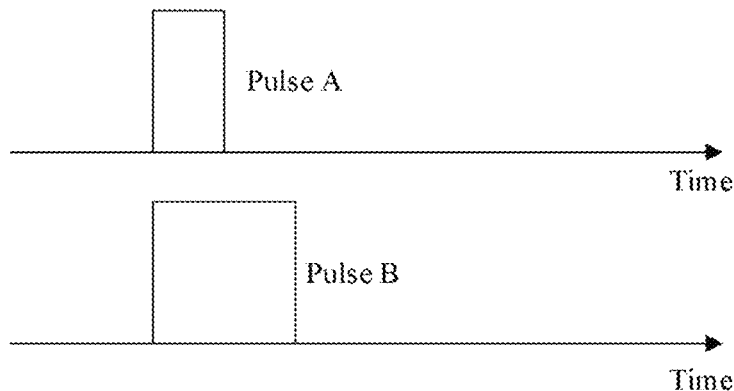
FIG. 2 is a comparison diagram of pulses of two pulse widths provided in an embodiment of the present application.

In the pulse testing method of the present embodiment, the plurality of pulses with different pulse widths of an OTDR device may be used to test a long optical fiber by using. The pulse width is the width of the pulse in a time domain. For example, if a second pulse width is less than a first pulse width, which indicates that the width of the first pulse width in the time domain is greater than that of the second pulse width in the time domain. For example, as shown in FIG. 2, a pulse A has a pulse width greater than that of a pulse B. In the embodiment of the present application, the pulse A is a wide pulse relative to the pulse B, and the pulse B is a narrow pulse relative to the pulse A.

In the present embodiment, the plurality of pulses corresponding to the first pulse width and the second pulse width are the pulses of a test beam, and the test beam is equal in frequency bands and optical power per unit time. At this moment, the emission of the plurality of pulses of different pulse widths may be simply realized by controlling the off/on time of a switch that emits the test beam. Therefore, the pulse test performed by using the plurality of pulses of different pulse widths has lower requirements on hardware circuits than by using the plurality of pulses of different power or different optical frequency bands, and even eliminates the need to modify the hardware structure of a testing apparatus, so the method features a low cost. The step of S110 may include the following steps of: performing the pulse test on the optical fiber by using the pulse of a first pulse width to obtain first test data; performing the pulse test on the optical fiber by using the pulse of a second pulse width to obtain second test data, the second pulse width is less than the first pulse width. Accordingly, the step of S120 may include a step of: fitting the first test data and the second test data.

The step of S110 may include a step of performing the pulse tests on the optical fiber by using the plurality of pulses of different pulse widths to obtain the test data of each pulse test. In this way, the test data will be obtained from the pulse tests performed by using the plurality of pulses of different pulse widths, and recorded.

Tests performed by using the plurality of pulses of different pulse widths and same wavelength or frequency will correspond to different dynamic ranges. Different dynamic ranges reflect different lengths of the testable optical fiber. Generally, the greater the dynamic range is, the greater the optical fiber length can be measured through the pulse test.

The extension of the pulse width to expand the dynamic range without modifying the hardware circuit in the OTDR and other testing apparatuses will result in scattering saturation at a proximal end, making it impossible to test optical fiber spans that are close to a test port. In the present example, on the one hand, to expand the dynamic range without modifying the hardware circuit of the testing apparatus and on the other hand, to avoid the scattering saturation at the proximal end due to the expansion of the dynamic range, the measurement is made at least twice by using the plurality of pulses of different pulse widths, so as to obtain the test data corresponding to the plurality of pulses of different pulse widths. When the test data of the entire optical fiber are required, the test data corresponding to the plurality of pulses of different pulse widths are simply fitted. For example, the test beam of a pulse width A can reach 100 km and still be detected by the test port after being reflected, but the scattering saturation at the proximal end will occur in an area 20 km from the test port. If a pulse is relatively high in power or relatively long in width, the power of the reflected or scattered beams at different positions of the optical fiber detected at the test port will be very high, even up to the maximum value detectable at the test port. As a result, it is impossible to distinguish the power of the reflected or scattered beams at different positions, which leads to the scattering saturation. The scattering saturation at the proximal end may result in an inability to detect the structural defects and other condition information about the optical fiber. In the present example, in order to obtain complete test information about the entire optical fiber, the measurement is made once by using the pulse of a pulse width B that can cover an area 20 km from the test port, and the test data obtained therefrom can accurately reflect the optical fiber condition in the area 20 km from the test port. In order to facilitate users to check test results, the testing apparatus or a control apparatus thereof will fit the test data corresponding to the plurality of pulses of the pulse widths A and B, so that the user can obtain the condition information about the entire optical fiber based on the test data obtained from the tests performed by using the plurality of pulses of different pulse widths, respectively. Apparently, in the embodiment, instead of upgrading the hardware of the testing apparatus, the dynamic range of the testing apparatus may also be expanded by testing several times with the plurality of pulses of different pulse widths of the testing apparatus, thus the method has the characteristics of simple implementation, low cost and strong compatibility with related technologies.

In the step of S120, fitting the test data corresponding to the plurality of pulses of different pulse widths includes: performing format conversion and/or unit unification on the test data corresponding to the plurality of pulses of different pulse widths, and splicing the test data corresponding to the plurality of pulses of different pulse widths, thereby obtaining the test data of a plurality of optical fiber spans along the length required to be tested.

In some embodiments, the step of S110 may include: performing a next pulse test by using a pulse of a pulse width smaller than that in the present pulse test when a scattering saturation index at the proximal end of the present pulse test fails to meet a predetermined condition.

In the present embodiment, a blind test may be performed by using the plurality of pulses of different pulse widths. For example, the measurement is firstly made by using the pulse of a maximum pulse width supported by the apparatus. If the scattering saturation at the proximal end occurs in a longer optical fiber range, a smaller pulse width will be selected, and the next test will be performed on the optical fiber by using the pulse of the selected pulse width until no scattering saturation occurs at the proximal end or the predetermined condition is met at the time of testing.

For example, the failure to meet the predetermined condition may include at least one of the followings: for example, if the length of the optical fiber with scattering saturation at the proximal end is not less than a preset length value, it is determined that the predetermined condition is not met. For another example, if a ratio of the length of the optical fiber with scattering saturation at the proximal end to a total length of the optical fiber is not less than a preset ratio, it is determined that the predetermined condition is not met. In this way, longer optical fibers may be measured by using the plurality of pulses of different pulse widths from the same testing apparatus. In the present example, the frequency or optical power of the test beam may be the same for the plurality of pulses of different pulse widths.

In some embodiments, the step S110 may include a step of performing a pulse test on the optical fiber by using a pulse of a first pulse width.

If the scattering saturation at the proximal end occurs, a pulse of a second pulse width is selected for the pulse test based on the length of an optical fiber span corresponding to the scattering saturation at the proximal end. For example, a correspondence between pulse width and test range is set in the testing apparatus or the control apparatus thereof. Here, the test range may be a length range of the optical fiber that the testing apparatus can test. For example, if an optical fiber span where scattering saturation occurs at the proximal end is A, a pulse width with a test range not less than A may be selected according to the correspondence, and the next pulse test may be performed by using the pulse of this pulse width, so as to minimize the frequency of the pulse test, improve the test efficiency, and reduce the number of pulses of which the test data are required to be fitted, thereby improving the fitting efficiency at the same time.

In still other embodiments, the step S110 may include a step of querying a combination relationship of the pulse widths based on the length of the optical fiber to be tested or the desired dynamic range, so as to determine the pulse widths of a plurality of pulses for the pulse test.

The length of the optical fiber span corresponding to the scattering saturation in the test using the pulse of the first pulse width may be determined from previous measurements, and the test range of the second pulse width is known in advance, so the combination relationship of different pulse widths may be preset at this moment. In this way, the first pulse width and the second pulse width may be combined to achieve the corresponding dynamic range, or to complete the pulse test for an optical fiber of a specific length.

Figure 3:
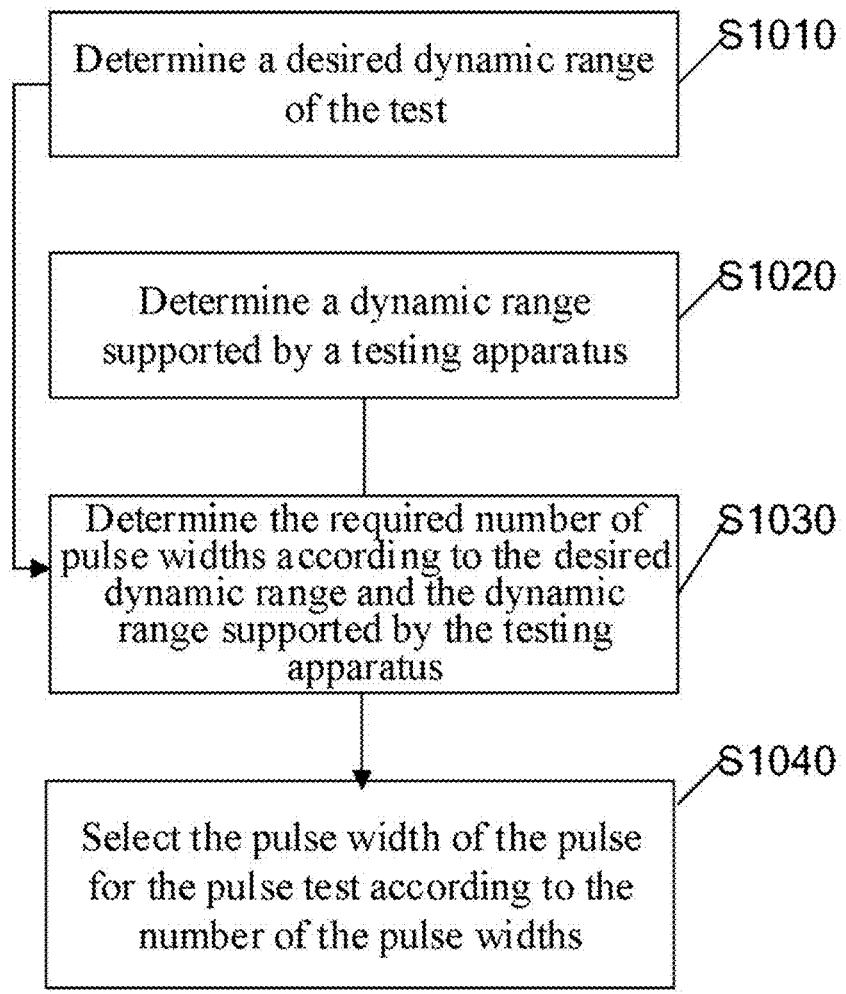
FIG. 3 is a flow diagram of determining pulse widths for the pulse test provided in an embodiment of the present application.

In other embodiments, as shown in FIG. 3, the method further includes the following steps.

In a step of S1010, a desired dynamic range of the test is determined.

In a step of S1020, a dynamic range supported by the testing apparatus is determined.

In a step of S1030, a required number of pulse widths is determined according to the desired dynamic range and the dynamic range supported by the testing apparatus.

In a step of S1040, the pulse widths of the pulse for the pulse test are selected according to the number of the pulse widths.

In the present embodiment, a desired dynamic range may be obtained in advance, and the apparatus has a dynamic range that can be supported thereby, so the required number of the pulse widths may be selected according to the desired dynamic range and the dynamic range supported by the device. Then, based on the number of the pulse widths, the plurality of pulses of corresponding pulse widths are selected for the pulse test in the step of S110.

In the present embodiment, the desired dynamic range may be calculated by the length of the optical fiber required to be measured currently. S1020 may include a step of querying parameters of the current testing apparatus to obtain the dynamic range supported by the testing apparatus. The parameters of the apparatus may include a model by which the dynamic range supported by the testing apparatus can be queried from a corresponding database.

In some embodiments, the step of S1030 may include a step of: calculating the number of the pulse widths required by the following formula: the number of the pulse widths required is calculated by I=INT (M*a/K)+1, where I is the number of the pulse widths; M is the desired dynamic range; K is the maximum dynamic range supported by the testing apparatus; INT ( ) is rounded down; a is a redundancy factor and is a positive number not less than 1.

In the present example, M is the desired dynamic range, k is the maximum dynamic range supported by the testing apparatus, and a is the redundancy factor which may be 1. However, to be on the safe side, it should be avoided that the test range of the smaller pulse width cannot completely cover the scattering saturation area of the larger pulse width due to unforeseen circumstances, which will make the test range of the smaller pulse width slightly larger than the scattering saturation area of the larger pulse width. At this moment, a may be 1.1, 1.2, 1.3 or 1.5. In some embodiments, a ranges from 1.1 to 2. In an embodiment, a ranges from 1.2 to 1.6.

For example, the desired dynamic range is 30 db, and the maximum dynamic range supported by the testing apparatus is 25 db. If a=1.2, I=INT(30*1.2/25)+1=2. At this moment, the testing apparatus with the maximum dynamic range of 25 db can achieve the dynamic range of 30 db through the emission of two pulses of different pulse widths.

In some embodiments, the step of S1040 may include following steps of: selecting the maximum pulse width supported by the testing apparatus when the number of the pulse widths is equal to 2; and selecting the minimum pulse width in the test range supported by the testing apparatus covering the scattering saturation range based on the scattering saturation range corresponding to the maximum pulse width.

Here, the scattering saturation range corresponding to the maximum pulse width is the range of the optical fiber span in which the testing apparatus will cause the development of scattering saturation at the proximal end when transmitting the pulse of the maximum pulse width supported by the testing apparatus for testing.

The scattering saturation range is a range in which scattering saturation occurs. If the number of the pulse widths is equal to 2, it is indicated that only two pulse widths are required to achieve the desired dynamic range. In an embodiment, any two pulse widths that bring the dynamic range up to the desired dynamic range may be selected. In the present example, to simplify the selection, and to ensure the success rate of the test, the maximum pulse width supported by the apparatus will be selected first, and the minimum pulse width in the test range supported by the testing apparatus covering the scattering saturation range will be selected based on the scattering saturation range corresponding to the maximum pulse width. In this way, the power consumption of the testing apparatus due to the emission of pulses is reduced. For example, the testing apparatus may provide M pulse widths, the first pulse width is the maximum pulse width and the $M^{th}$ pulse width is the minimum pulse width of the testing apparatus, so the test ranges from the $M^{th}$ pulse width to the first pulse width decrease successively, and the scattering saturation areas resulting in the scattering saturation at the proximal end increase successively. If the first pulse width is selected, the test range of the $M^{th}$ pulse width is not smaller than the scattering saturation range of the first pulse width, and the test range of the $M-1^{th}$ pulse is larger than the scattering saturation range of the first pulse width and the test range of the $M^{th}$ pulse width. The test range of the $M+1^{th}$ pulse width is smaller than the scattering saturation range of the first pulse width, and the $M^{th}$ pulse width is selected as the pulse width for the pulse test. For example, if the scattering saturation range of the first pulse width is larger than the test range of the third pulse width and smaller than the test range of the second pulse width, the second pulse width is selected for testing the optical fiber, and then the test data of the entire optical fiber may be obtained either by splicing directly or by fitting and accumulating the test data from the tests performed by using the pulses of the first and second pulse widths.

In the step of S110, the pulse width is adjusted by controlling the on-off time of a switch that emits the test beam during the test. Scattering saturation is saturation caused by light scattering, while reflecting saturation is saturation caused by light reflection.

With the pulse testing method provided in the embodiment, the testing apparatus may be used to emit the plurality of pulses of different pulse widths, so as to flexibly provide the tests with various dynamic ranges that can flexibly meet different needs while minimizing the test power consumption, for example, by reducing the types of the pulse widths used.

In some embodiments, the step of S1040 may include the following steps of: selecting the maximum pulse width and the minimum pulse width supported by the testing apparatus when the number of the pulse widths is greater than 2; selecting the remaining pulse widths according to the scattering saturation range corresponding to the maximum pulse width and the test range of the minimum pulse width.

In some embodiments, a union of the test range of the remaining pulse width and that of the minimum pulse width can cover the range in which the scattering saturation occurs at the proximal end corresponding to the maximum pulse width so that all data of the entire optical fiber can be obtained.

In the present example, the number of pulse widths is greater than 2, indicating that three or more pulse widths are required. In the present example, to avoid the problem of too many pulse tests or high power consumption caused by unreasonable selection of the pulse widths, the maximum pulse width supported by the testing apparatus is selected first, and the minimum pulse width of the testing apparatus is selected at the same time, so that there is no or very low probability of scattering saturation at the proximal end, thereby ensuring that the entire optical fiber can be tested.

After the maximum pulse width and the minimum pulse width are selected, a plurality of intermediate pulse widths smaller than the maximum pulse width and larger than the minimum pulse width can be selected according to the scattering saturation range corresponding to the maximum pulse width and the test range of the minimum pulse width. The intermediate pulse width may also result in scattering saturation areas, but the scattering saturation area of the intermediate pulse width can be covered by the minimum pulse width. In some embodiments, when the number of the pulse widths is greater than 2, after the maximum and minimum pulse widths supported by the testing apparatus are selected, the pulse widths may be selected according to the number of the pulse widths to be selected by taking the values of the two adjacent pulse widths as a geometric sequence.

In some embodiments, the step of S120 may include a step of: converting second test data according to a data format of first test data, the first test data are the test data corresponding to the pulse of the first pulse width, the second test data are the test data corresponding to the pulse of the second pulse width, and the first pulse width is greater than the second pulse width. In this way, the second test data corresponding to the pulse of small pulse width are converted into the data format of the first test data corresponding to the pulse of large pulse width. In some embodiments, the step S120 further includes a step of splicing the first test data and the converted second test data.

Herein, converting second test data according to a data format of first test data may include a step of: converting the second test data based on the first test data.

In the embodiment, the test data corresponding to the pulse of a smaller pulse width may also be converted according to the data format corresponding to the pulse of a large pulse width. In other embodiments, the test data corresponding to the pulses of the larger pulse width may be converted according to the data format corresponding to the pulse of the smaller pulse width. After data conversion, the test data corresponding to the plurality of pulses of different pulse widths are spliced. In an embodiment, whether to convert the test data corresponding to the pulses of the smaller pulse width according to the data format corresponding to the pulses of the larger pulse width or to convert the test data corresponding to the pulses of the larger pulse width according to the data format corresponding to the pulses of the smaller pulse width may be determined according to user requirements, for example, by instructions entered by the user.

In some embodiments, converting second test data according to a data format of first test data may include a step of: converting the second test data by the following formula:

$$A(n), 1 \leq n \leq (2L*f)/v$$

$$B(n) = \sum_{i=1}^{I} A(n - m*(i-1))$$

$$I = T_1/T_2$$

$$m = f*T_2,$$

where A(n) denotes the second test data; B(n) denotes the converted second test data;

I denotes the number of pulses of the second pulse width required to be fitted into a pulse of the first pulse width; i denotes the serial number of the required pulse of the second pulse width; $T_1$ denotes the first pulse width; $T_2$ denotes the second pulse width; f denotes a sampling frequency; m denotes the number of sampling points of a pulse of the second pulse width; L denotes the length of the optical fiber; v denotes a propagation velocity of the test beam in the optical fiber; and n denotes the number of the second test data.

Figure 4:
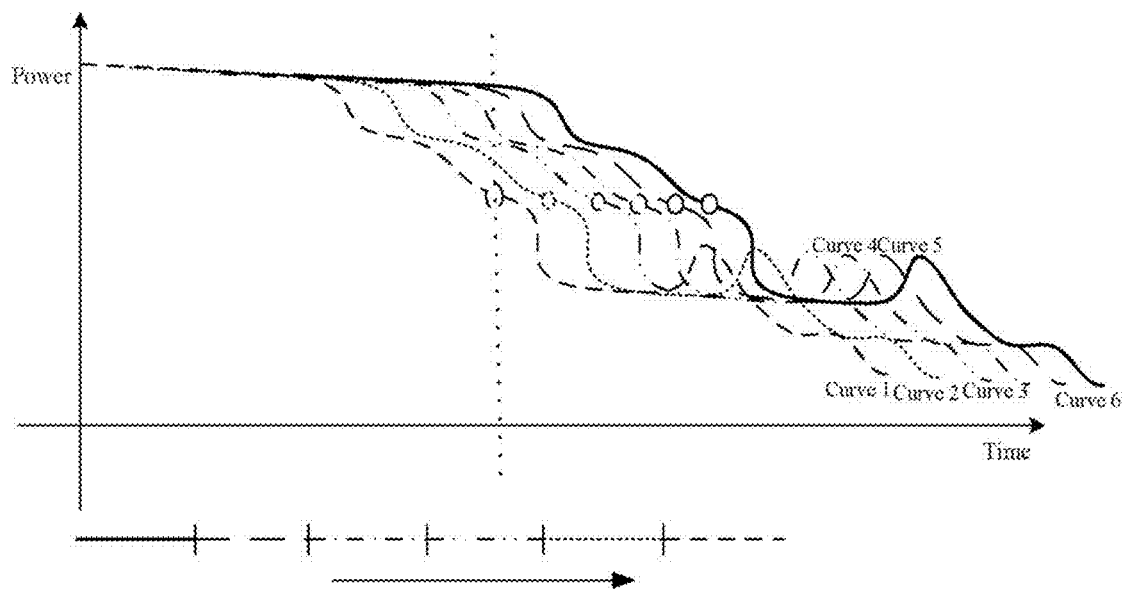
FIG. 4 is a schematic diagram of fitting a plurality of narrow pulses into a wide pulse provided in an embodiment of the present application.

In the process of fitting the pulses of a small pulse width into the pulses of a large pulse width, the pulses of the small pulse width may be sequenced according to the emission time thereof, so that the pulses of the small pulse width may be fitted into the pulses of the large pulse width by accumulating the test data corresponding to the time-sequenced pulses of small pulse width. By fitting the pulses of the small pulse width into the pulses of the large pulse width, the data corresponding to the pulses of the small pulse width can be completely retained, so that the fitted data can be illustrated uniformly and consistently on a time domain diagram or a distance diagram of the test data. For example, the responsivity R of Avalanche Photo Diode (APD) in the testing apparatus generally does not vary with the input power Po, and the conversion current Ip generated by a wide pulse may be equal to the sum of conversion currents generated by a plurality of successive narrow pulses. That is, the voltage generated by the wide pulse may simply be equal to the sum of the voltages generated by the plurality of successive narrow pulses. Voltage signals generated by the plurality of successive narrow pulses may be obtained by translating a set of narrow pulse data along a time axis. To this end, a wide pulse may be split into a plurality of narrow pulses along the time axis. FIG. 4 is a schematic diagram of splitting a wide pulse of a large pulse width into a plurality of narrow pulses of a small pulse width, or a schematic diagram of combining a plurality of pulses of a small pulse width into a pulse of a large pulse width.

A wide pulse with uniform optical power may be split into a plurality of narrow pulses when its pulse width is T. The sum of the pulse widths of the split narrow pulses is equal to the pulse width of the wide pulse. When the wide pulse of the large pulse width is split into a plurality of narrow pulses of the small pulse width, the pulse width of the narrow pulses may be equal or unequal. For example, a wide pulse is split into six narrow pulses of equal pulse width T/6. Moreover, the six narrow pulses transmit the same optical power, that is, the adjacent small pulse widths have the equal transmission time of T/6. The cumulative fitting of six small pulse widths along the time axis may be shown in FIG. 4. In FIG. 4, the abscissa represents the time axis, and the ordinate represents the power of backscattered light detected at a detection end. Curves of different line styles respectively represent the power of backscattered light generated by the six narrow pulses on a test line. Since the optical power and pulse width of the six narrow pulses are identical, but with a relative time lag of T/6, the shapes of these six optical power curves should be identical and translated by T/6 in turn along the time axis. Assuming that the power function of backscattered light generated by the narrow pulses in a first column is p(t) (see curve 1), and P1(t)=p(t), the power function of backscattered light generated by the narrow pulses in a second column (see curve 2) is P2 (t)=p (t−T/6); the power function of backscattered light generated by the narrow pulses in a third column (see curve 3) is P3 (t)=p (t−T/6*2); the power function of backscattered light generated by the narrow pulses in a fourth column (see curve 4) is P4 (t)=p (t−T/6*3); the power function of backscattered light generated by the narrow pulses in a fifth column (see curve 5) is P5 (t)=p (t−T/6*4); and the power function of backscattered light generated by the narrow pulses in a sixth column (see curve 6) is P6=p (t−T/6*5). The power function of backscattered light detected by a wide pulse test for a given moment is $P_{total}$ (t)=p (t)+p (t−T/6)+p (t−T/6*2)+p (t−T/6*3)+p (t−T/6*4)+p (t−T/6*5), so the optical power generated by the wide pulse may be fitted as long as the power function of backscattered light generated by the narrow pulses in the first column is measured. The optical power may be the power measured at the test port. Therefore, in the present example, $P_{total}$ (t)=p (t)+p (t−T/6)+p (t−T/6*2)+p (t−T/6*3)+p (t−T/6*4)+p (t−T/6*5) may be adopted during data conversion to fit the test data corresponding to a plurality of pulses of the small pulse width into the test data corresponding to a pulse of the large pulse width, i.e., to convert the test data corresponding to the pulse of the large pulse width into the test data corresponding to the plurality of pulses of the small pulse width.

In some embodiments, the step of S120 may further include a step of directly splicing the test data corresponding to the plurality of pulses of different pulse widths. For example, the step of S120 may include a step of directly splicing the test data of the plurality of pulses of different pulse widths without converting the test data of the plurality of pulses of different pulse widths.

Figure 5:
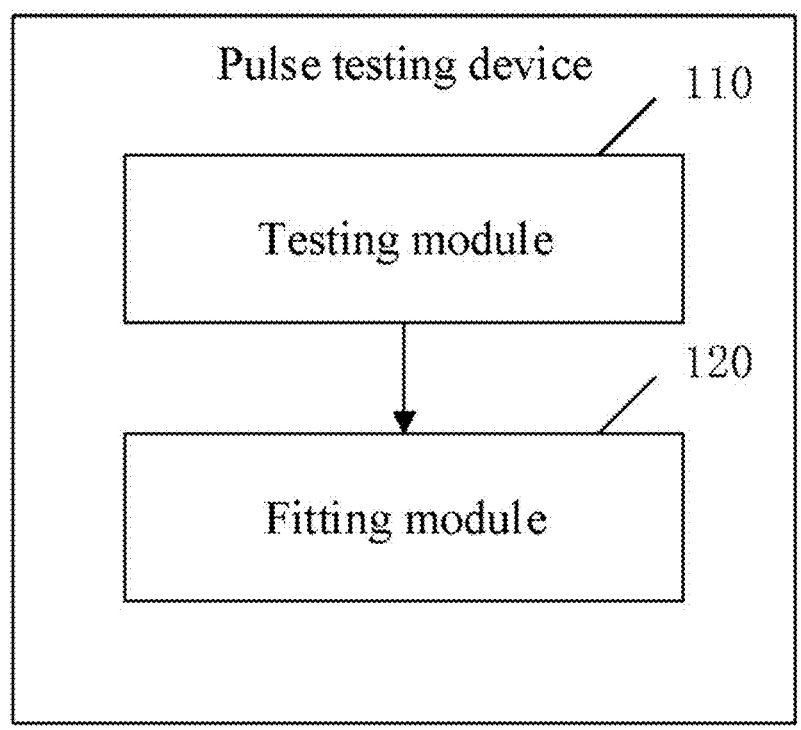
FIG. 5 is a structural diagram of a pulse testing device provided in an embodiment of the present application.

As shown in FIG. 5, the present example provides a pulse testing device, including: a testing module 110 configured to perform a pulse test on an optical fiber by using pulses of different pulse widths to obtain test data; and a fitting module 120 configured to fit the test data corresponding to the plurality of pulses of different pulse widths.

The testing module 110 and the fitting module 120 may both correspond to a program module. After being executed by a processor, the testing module 110 may control the testing apparatus to emit test pulses of different pulse widths, so as to perform the pulse test and detect the test data.

The fitting module 120 may also be a program module. After being executed by the processor, the fitting module 120 may fit the test data of different pulse widths, thereby improving the dynamic range of the test or increasing the length of the optical fiber that can be tested by the apparatus.

In the present embodiment, instead of having to make modifications to the hardware thereof to test longer optical fibers, the testing apparatus is controlled to perform tests by using different pulse widths, thereby having the characteristics of simple implementation and low hardware cost.

In some embodiments, the testing module 110 is configured to perform a next pulse test by using a pulse of a pulse width smaller than that in the present pulse test when scattering saturation at the proximal end of the present pulse test fails to meet a predetermined condition. If scattering saturation occurs in the present pulse test, the next pulse test is performed by using the pulses of a pulse width smaller than that in the present pulse test until no scattering saturation develops, and then the test data corresponding to the pulses of various pulse widths are fitted, thus the test data of a plurality of spans of the entire optical fiber can be obtained.

In some embodiments, the device further includes a first determination module configured to determine a desired dynamic range of the test; a second determination module configured to determine a dynamic range supported by the testing apparatus; a third determination module configured to determine the number of the required pulse widths according to the desired dynamic range and the dynamic range supported by the testing apparatus; and a selection module configured to select the pulse widths of the pulse for pulse test according to the number of the pulse widths.

In some embodiments, the variety of the pulse widths that can be supported by a testing apparatus is also limited. The minimum number of pulse widths that can achieve the desired dynamic range may be selected based on the number of pulse widths.

In some embodiments, the third determination module is configured to calculate the number of the pulse widths required by the following formula: I=INT (M*a/K)+1, where I denotes the number of the pulse widths; M denotes the desired dynamic range; K denotes the maximum dynamic range supported by the testing apparatus; INT ( ) denotes rounded down; a denotes a redundancy factor which is a positive number not less than 1.

In other embodiments, the selection module is configured to select the maximum pulse width supported by the testing apparatus when the number of the pulse widths is equal to 2, and to select the minimum pulse width in the test range supported by the testing apparatus covering the scattering saturation range according to the scattering saturation range corresponding to the maximum pulse width, the scattering saturation range is a range in which scattering saturation occurs.

In some embodiments, the selection module is configured to select the maximum pulse width and the minimum pulse width supported by the testing apparatus when the number of the pulse widths is greater than 2, and to select the remaining pulse widths according to the scattering saturation range corresponding to the maximum pulse width and the test range of the minimum pulse width, the scattering saturation range is a range in which scattering saturation occurs. In some embodiments, a union of the test range of the remaining pulse width and that of the minimum pulse width can cover the range in which the scattering saturation occurs at the proximal end corresponding to the maximum pulse width.

In some embodiments, the fitting module 120 is configured to covert the second test data according to the data format of the first test data, and to splice the first test data and the converted second test data, the first test data is the test data corresponding to the pulse of a first pulse width, the second test data is the test data corresponding to the pulse of a second pulse width, and the first pulse width is greater than the second pulse width.

The fitting module 120 is configured to convert the second test data according to the following formula:

$$A(n), 1 \leq n \leq (2L*f)/v$$

$$B(n) = \sum_{i=1}^{I} A(n - m*(i-1))$$

$$I = T_1/T_2$$

$$m = f*T_2,$$

where A(n) denotes the second test data; B(n) denotes the converted second test data;

I denotes the number of pulses of the second pulse width required to be fitted into a pulse of the first pulse width; i denotes the serial number of the required pulse of the second pulse width; $T_1$ denotes the first pulse width; $T_2$ denotes the second pulse width; f denotes a sampling frequency; m denotes the number of sampling points of a pulse of the second pulse width; L denotes the length of the optical fiber; and v denotes the propagation velocity of the test beam in the optical fiber.

The fitting module 120 is configured to splice the test data corresponding to the plurality of pulses of different pulse widths.

Figure 6:
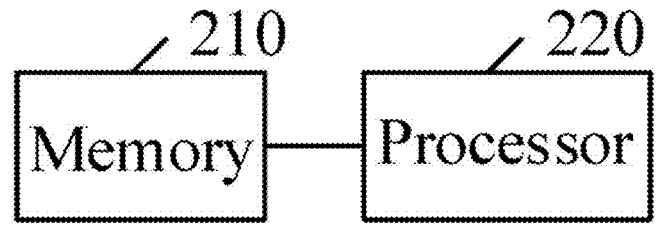
FIG. 6 is a structural diagram of a testing apparatus provided in an embodiment of the present application.

As shown in FIG. 6, the present example provides a testing apparatus, including a memory 210 and a processor 220. The processor 220 is connected with the memory 210, and is configured to perform the pulse testing methods provided in one or more embodiments of the present disclosure by executing a computer program.

The memory 210 may be a memory of any type, such as Read-Only Memory (ROM), Random Access Memory (RAM) or flash memory.

The processor 220 may be any type of processor, such as a central processing unit, a digital signal processor, an application processor, a programmable array or a digital signal processor.

The processor 220 may be connected with the memory through an integrated circuit bus, etc., and may perform the pulse testing method provided in one or more of the above technical schemes by executing the computer program stored in the memory.

In some embodiments, the testing apparatus may further include a display screen connected with the processor and used for drawing test icons formed by fitting and splicing the test data of the same optical fiber using different pulse widths, and the test icons may be as shown in the figure.

In some embodiments, the testing apparatus may include a test beam emitting device and a receiving device, which may be a laser emitting device and a receiving device. The test beam emitting device may be configured to emit test laser beams of different pulse widths, and the receiving device may be configured to detect laser beams reflected or scattered from different positions of an optical fiber, thereby producing the test data.

In the present embodiment, a computer storage medium in which a computer program is stored is further provided. After the computer program is executed, the pulse testing method, such as one or more of the methods shown in FIGS. 1, 3, 7, 11 and 16, provided in one or more embodiments of the present application may be performed.

The computer storage medium may be a removable storage device, ROM, RAM, magnetic disc or optical disc, or a variety of media that can store program codes, optional non-instant storage media.

Some optional examples are provided below.

EXAMPLE ONE

Figure 7:
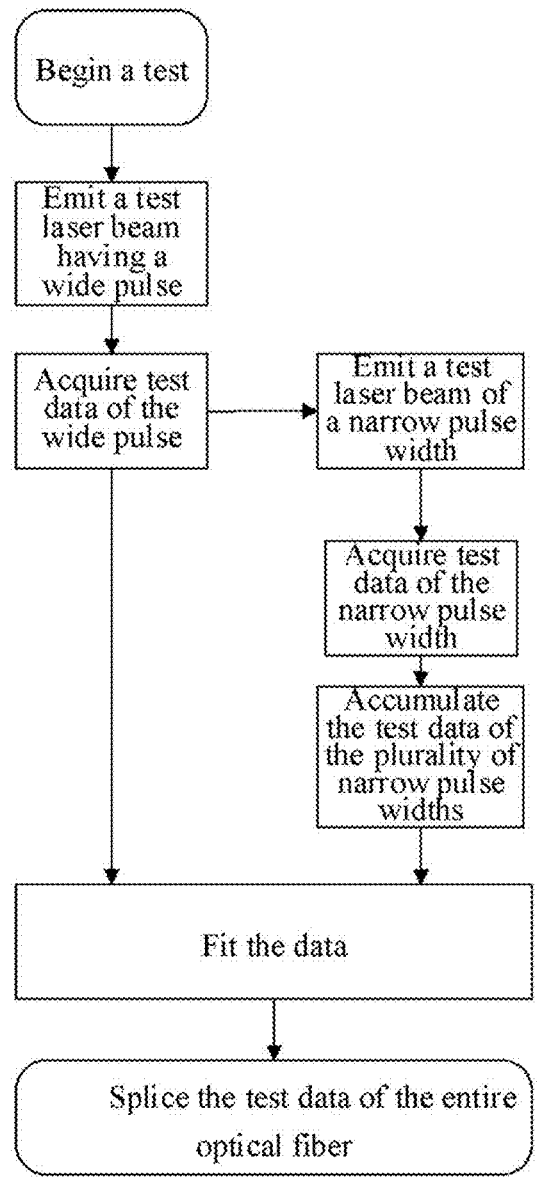
FIG. 7 is a flow diagram of a second pulse testing method provided in an embodiment of the present application.

As shown in FIG. 7, a testing method is provided in the present example, including following steps.

A test begins.

A test laser beam having a wide pulse is emitted.

Test data of the wide pulse are acquired.

A test laser beam of a narrow pulse width is emitted.

Test data of the narrow pulse are acquired.

The test data of the plurality of narrow pulse widths are accumulated.

The data are fitted. In an embodiment, the test data of the wide pulse and the accumulated test data of the narrow pulses are fitted.

The test data of the entire optical fiber is spliced.

According to the above analysis, the effective dynamic range of a single pulse width is K=25 db. If the fitted dynamic range M=30 db is required to be greater than K, the pulse type is selected as I=INT(M*1.2/K)+1=2. The maximum pulse width $T_{max}$=20 us. Since it is required to expand the dynamic rang by only 5 db, $T_{min}$=100 ns is selected, and a circuit is adjusted to make the scattering signal at the proximal end nearly saturated (about 4 db away from saturation is selected) during testing with $T_{min}$=100 ns, so that the pulse width of only 100 ns is actually needed to fit the pulse width of 20 us.

When the narrow pulse width of 20 us is fitted by the narrow pulse width of 100 ns:

$$i = 20 \text{ us}/100 \text{ ns} = 200,$$

$$m = 100*10^{\wedge}(-9)*200*10^{\wedge}(6) = 20,$$

$$B(n) = \sum_{k=1}^{200} A(n - 20*(k - 1)),$$

where $1 \leq n \leq 2L*f/V$, where, B(n) denotes the test data of the restored pulse of 20 us pulse width calculated according to the narrow pulse.

Figure 8:
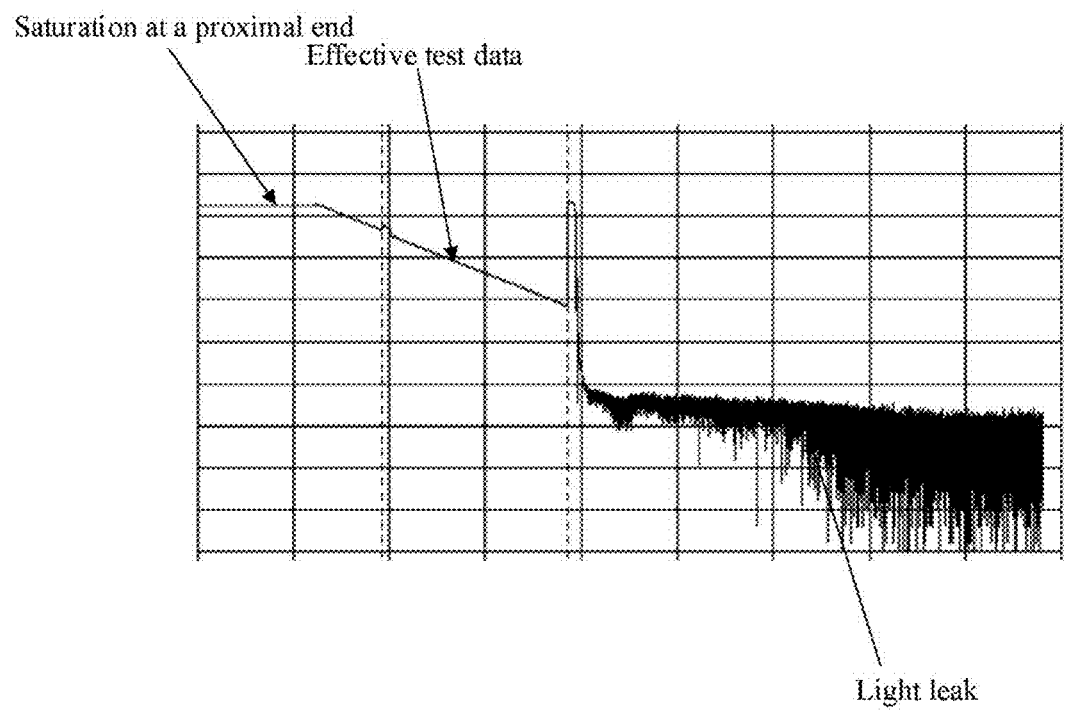
FIG. 8 is a test curve of a wide pulse in an Example one according to the present application.

As shown in FIG. 7, a test is performed by a wide pulse first, a test laser beam having the wide pulse is emitted, and the power data of backscattered light generated by the test laser beam having the wide pulse are acquired. The test data after being fitted and spliced are shown in FIG. 8. It can be seen from the test curve that there is a flat area at the proximal end, indicating that the scattering saturation in this area needs to be restored by performing the narrow pulse test.

Figure 9:
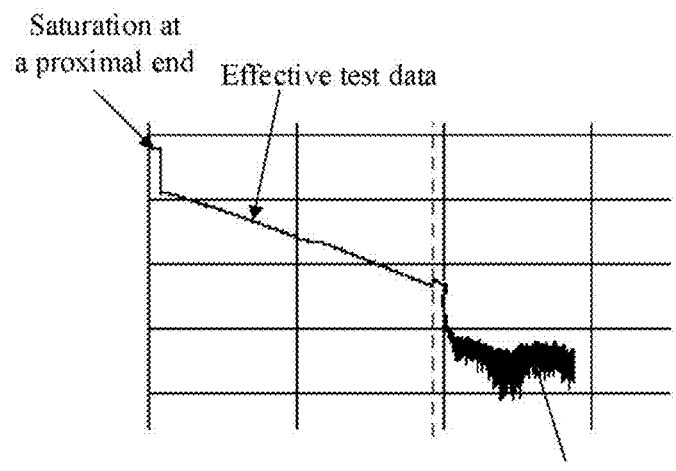
FIG. 9 is a test curve of a narrow pulse in the Example one according to the present application.

FIG. 9 is a schematic diagram of test data of narrow pulses. The length of the optical fiber corresponding to grids shown in FIG. 8 and FIG. 9 is the same. In both FIGS. 8 and 9, the horizontal axis may represent the length of the optical fiber, and the vertical axis represents the measured power of the reflected or scattered beam. Apparently, by comparing FIG. 8 with FIG. 9, the wide pulse will cause scattering saturation in a proximal area of the optical fiber corresponding to a multi-grid at the proximal end in FIG. 8. However, in FIG. 9, there is no scattering saturation or saturation only occurs in a small portion of the area. Therefore, in the present example, the test range corresponding to the effective data of small pulses (i.e., narrow pulse) may cover a predetermined proportion of the scattering saturation area of large pulses (wide pulse). For example, the proportion may be 90%, 85% or 95%.

Figure 10:
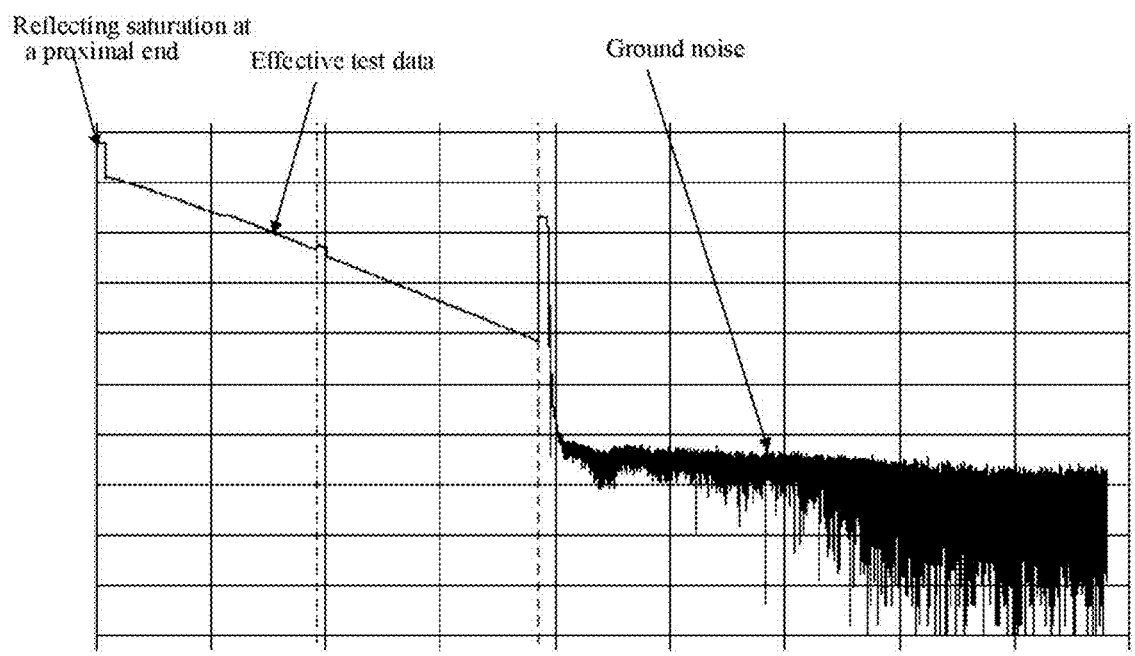
FIG. 10 is a schematic diagram of splicing the test curves shown in FIGS. 8 and 9.

FIG. 10 is a schematic diagram after the test data of the wide and narrow pulses are fitted. Apparently, FIG. 10 is a schematic diagram after the test data in FIG. 8 and the accumulated test data in FIG. 9 are spliced. Apparently, the scattering saturation area is very small and almost negligible, thereby expanding the dynamic range of the pulse test on the optical fiber.

EXAMPLE TWO

Figure 11:
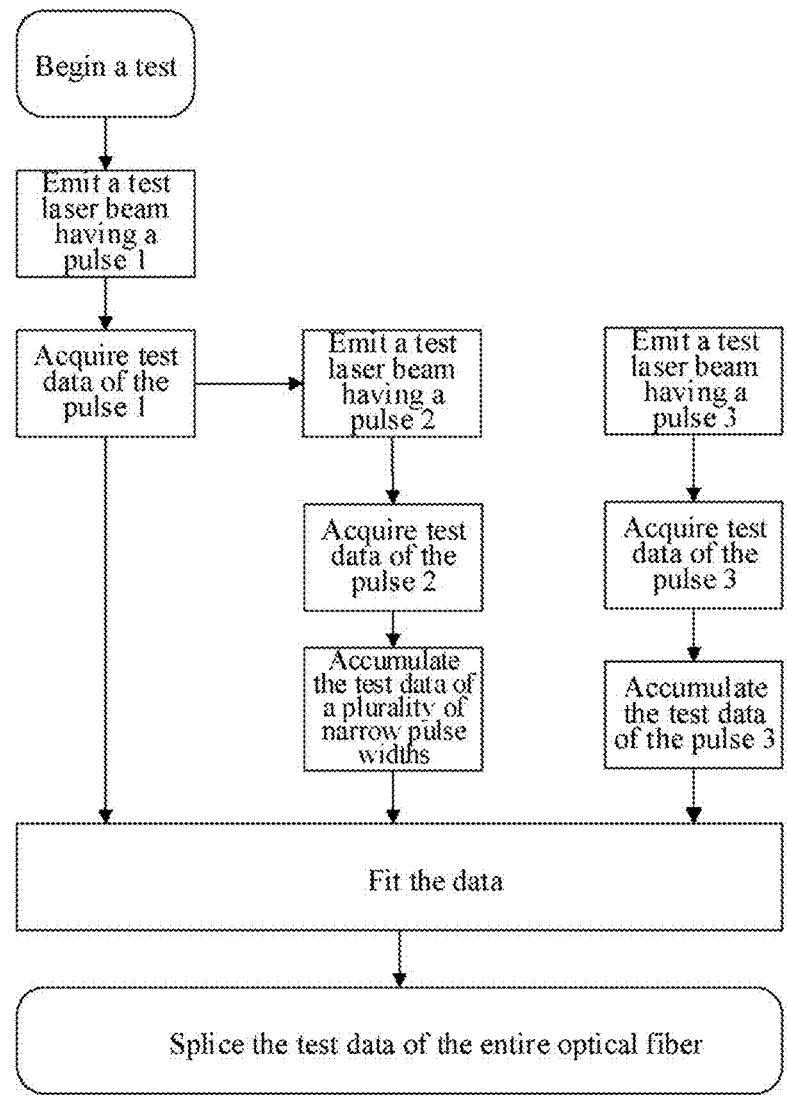
FIG. 11 is a flow diagram of a third pulse testing method provided in an embodiment of the present application.

In the present example, the test is performed many times by using the plurality of pulses of different pulse widths, and the test data of the wide pulse are converted into the data format of the test data of the narrow pulse based on the principle of fitting the narrow pulses to form a wide pulse. As shown in FIG. 11, a testing method is provided in the present example, including following steps.

A test begins.

A test laser beam having a pulse 1 is emitted.

Test data of the pulse 1 are acquired.

A test laser beam having a pulse 2 of a pulse width smaller than that of the pulse 1 is emitted, and the pulse width of pulse 2 is smaller than that of the pulse 1.

Test data of the pulse 2 are acquired.

The data of the pulse 2 are accumulated.

A test laser beam having a pulse 3 is emitted.

Test data of the pulse 3 are acquired, and the pulse width of the pulse 3 is smaller than that of the pulse 2.

The data of the pulse 3 are accumulated.

The data of the pulses 1 and 2 and the test data of the pulse 3 are fitted to splice the test data of the entire optical fiber. The above data accumulation includes: splicing the data according to the acquisition time of the test data, or splicing the test data in a time domain according to the emission time of the pulses. The above data fitting includes: data format conversion according to different pulses acting on different positions of the same optical fiber, etc., so that the test data may be completely illustrated on a data graph or a data table.

Figure 12:
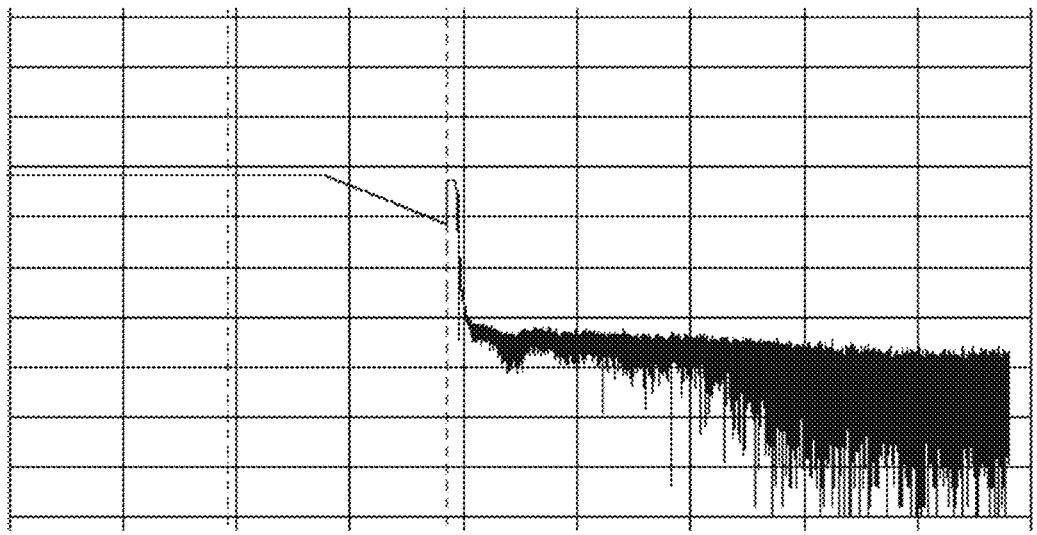
FIG. 12 is a test curve of a pulse 1 in an Example two according to the present application.
Figure 13:
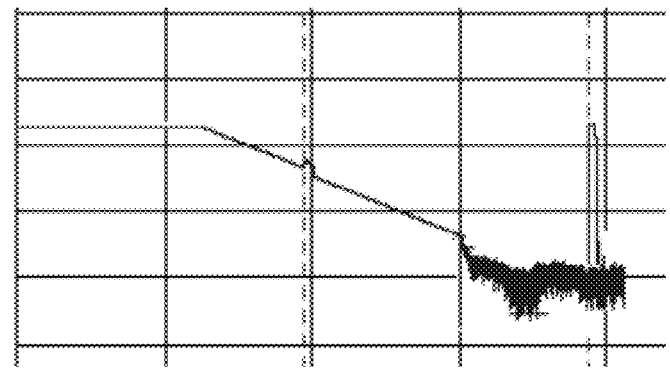
FIG. 13 is a test curve of a pulse 2 in the Example two according to the present application.
Figure 14:
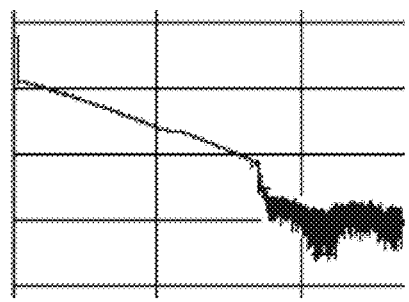
FIG. 14 is a test curve of a pulse 3 in the Example two according to the present application.
Figure 15:
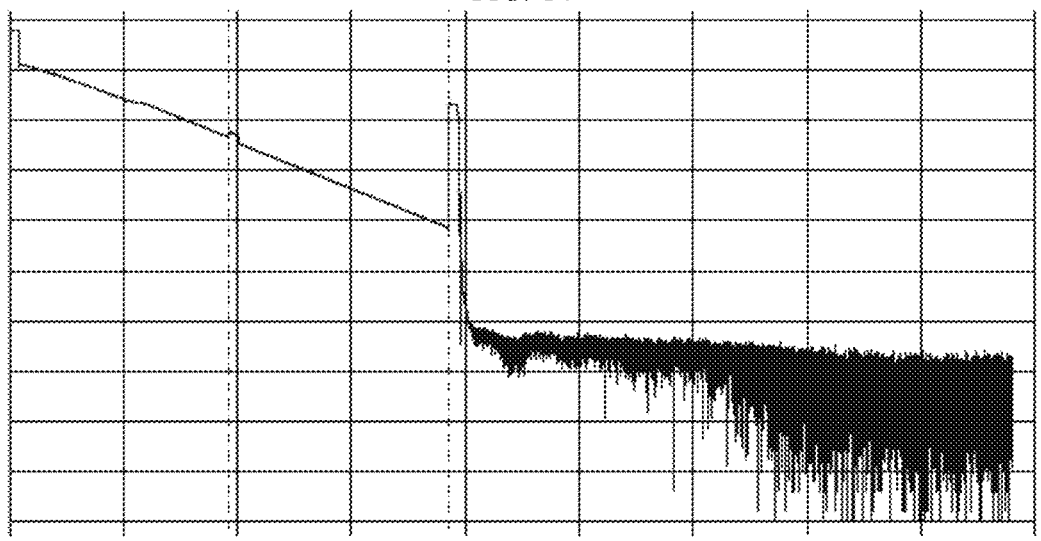
FIG. 15 is a schematic diagram of splicing the test curves shown in FIGS. 12 to 14.

Sometimes, due to the limitation imposed by hardware circuits, the dynamic range of a single pulse test is small. In cases where a larger dynamic range is required, sometimes the complete OTDR optical path information cannot be completely restored by two pulses, but by fitting the data from the tests performed by using three or more different width pulses. Fitting the data from the tests performed by using the pulses of a variety of widths is shown in FIG. 15. Assuming that the pulse width of the pulse 1 is the largest, the pulse width of the pulse 2 ranks second, that of the pulse 3 ranks third, and that of the pulse n is the smallest. A plurality of pulse widths should ideally decrease in proportion to each other. Some examples will be given below. In FIGS. 12 to 15, the horizontal axis can correspond to the length of the optical fiber from the test port, and the vertical axis can be the tested optical power. The lengths of the optical fibers corresponding to each grid in FIGS. 12 to 15 are equal. Apparently, the scattering saturation range produced during the test performed by using the pulse 1 is the largest, followed by that produced during the test performed by using the pulse 2, and no scattering saturation is produced during the test performed by using the pulse 3. Three test patterns in FIGS. 12, 13 and 14 are fitted and spliced to form a test power diagram as shown in FIG. 15. Apparently, the effective data range of the pulses 2 and 1 can almost completely cover the scattering saturation range of the pulse 1.

Assuming that OTDR has a maximum test capability of only 14 db in a dynamic range of the single pulse width, but the dynamic range of the system is required to reach 30 db. How to solve this problem? According to the above analysis, the effective dynamic range of the single pulse width is K=14 db. If the fitted maximum dynamic range M=30 db is required to be greater than K, the pulse type is selected as I=INT (M*1.2/K)+1=3. According to the above calculation, there is actually an overlapping area of 14*3−30=12 db, that is, the selection of intermediate pulse width may allow the deviation within 4 times. With the overlapping area, the pulse of pulse width in adjacent bands will have an overlapping range corresponding to the effective data. The maximum pulse width T1=20 us. Since it is required to expand the dynamic range by 16 db from 20 us, a smaller pulse width T2=10 ns is selected, and a circuit is adjusted to make the scattering signal at the proximal end nearly saturated (several db may be reserved) during testing with T2=10 ns. Because the test is required to be performed by three pulses, the intermediate pulse width may be 450 ns, and may also be selected as 500 ns within 4 times. In this way, it is actually necessary to fit the pulse width of 10 ns into the pulse width of 20 us and the pulse width of 500 ns into the pulse width of 20 us. Finally, three sets of test data are spliced to obtain complete test data.

As shown in FIG. 15, the present example is realized by the following method: a test is performed by using the widest pulse 1 first, a test laser beam having the pulse 1 is emitted, and the power data of backscattered light generated by the test laser beam having the pulse 1 are acquired, to obtain the data shown in FIG. 12. It can be seen from the test curve that there is a large flat area at the proximal end, indicating that the scattering saturation in this area needs to be restored performing the narrow pulse test.

A test laser beam having a pulse 2 is emitted, the power data of backscattered light generated by the laser beam for the test using the pulse 2 are acquired, and the detected data are translated and accumulated. The accumulation rule is described in Embodiment 1, and the data shown in FIG. 13 are obtained. From the test curve, it can be seen that there is still scattering saturation at the proximal end during the pulse 2 test, and no complete information about the optical path can be obtained.

In this way, it is necessary to further perform the test by using a narrower pulse, that is, a test laser beam having a pulse 3 is emitted, the power data of backscattered light generated by the laser beam for the pulse 3 test are acquired, and the detected data are translated and accumulated until the data at the proximal end can be completely restored. The accumulation rule is described in Example one. In the present example, assuming that the test using the pulse 3 can display complete information at the proximal end, and the data shown in FIG. 14 may be obtained after multiple accumulations. From the test curve, it can be seen that the test range of the pulse 3 is short, but the short-distance information is complete.

Finally, the complete information about the wide pulse optical path may be obtained by splicing the three sets of test data, as shown in FIG. 10.

EXAMPLE THREE

Figure 16:
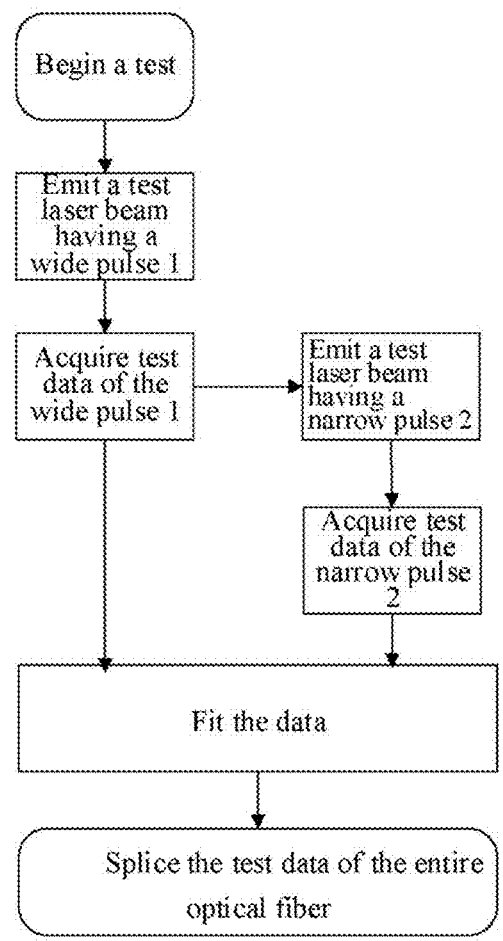
FIG. 16 is a flow diagram of a fourth pulse testing method provided in the embodiment of the present application.

As shown in FIG. 16, an example of direct fitting and splicing of the test data of the two pulses is provided in the present example, including following steps.

A test begins.

A test laser beam having a wide pulse 1 is emitted.

Test data of the wide pulse 1 are acquired.

A test laser beam having a narrow pulse 2 is emitted.

Test data of the narrow pulse 2 are acquired.

The test data of the wide pulse 1 and the narrow pulse 2 are directly fitted to form the test data of an entire optical fiber.

Figure 17:
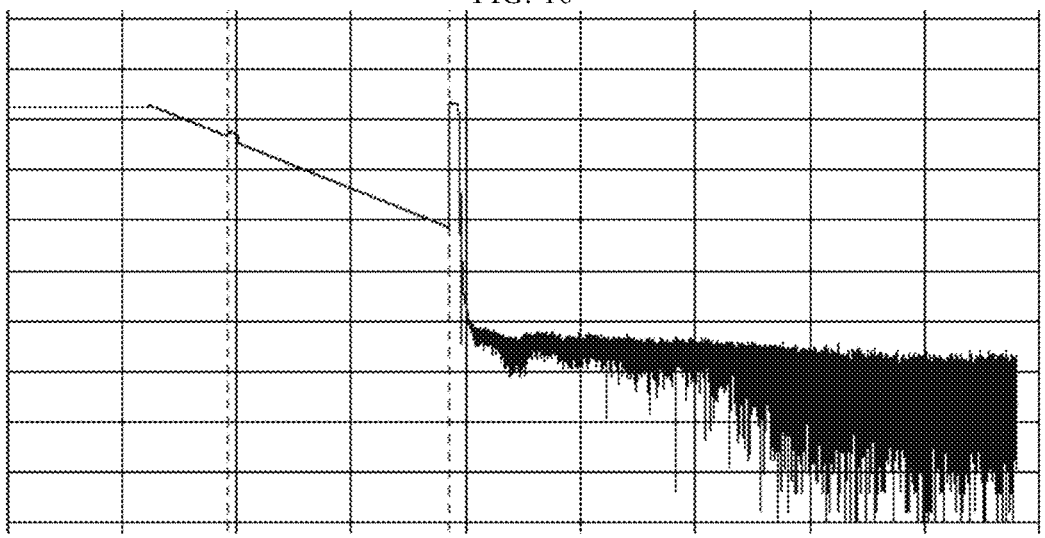
FIG. 17 is a test curve of a wide pulse in an Example three according to the present application.

The present example is realized by the following method: a test is performed by using the wide pulse first, a laser beam for the wide pulse test is emitted, and the power data of backscattered light generated by the laser beam for the wide pulse test are acquired. The test data is shown in FIG. 17. It can be seen from the test curve that there is a flat area at the proximal end, indicating that the scattering saturation in this area needs to be restored by performing the narrow pulse test.

Figure 18:
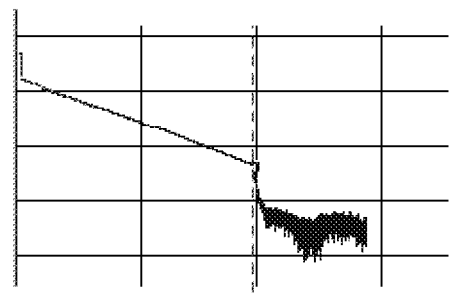
FIG. 18 is a test curve of the narrow pulse in the Example one according to the present application.

A test laser beam having a narrow pulse is emitted, and the power data of backscattered light generated by the laser beam for the narrow pulse test are acquired, as shown in FIG. 18. It can be seen from the test curve that the narrow pulse test range is short, but the information at the proximal end is complete. Finally, the complete information about the optical path shown in FIG. 19 may be obtained by directly splicing the information from the two tests.

Figure 19:
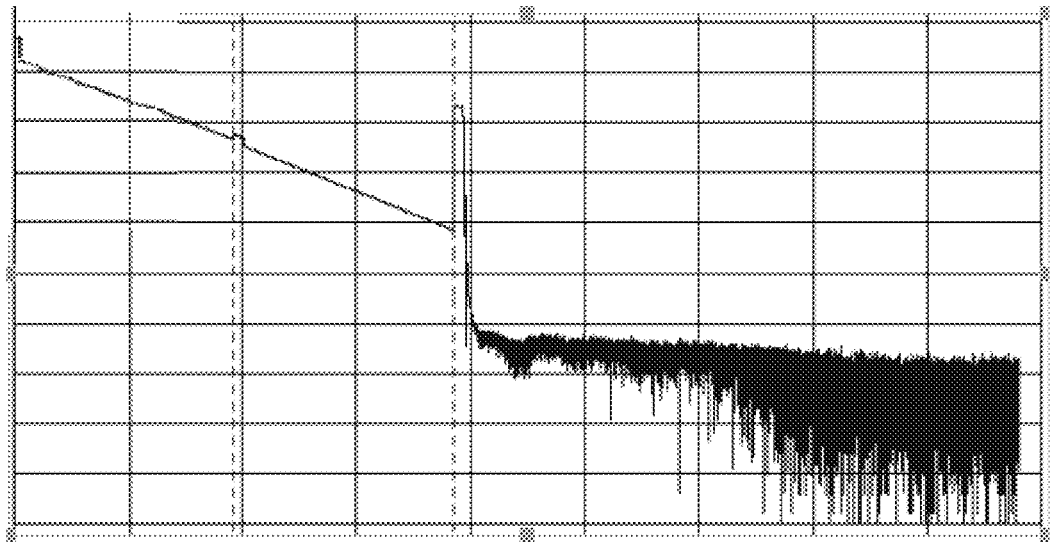
FIG. 19 is a schematic diagram of splicing the test curves shown in FIGS. 17 and 18.

In FIGS. 17 to 19, the horizontal axis also represents the distance of the optical fiber from the test port, and the vertical axis represents the measured power of the reflected and scattered beam. In FIGS. 17 to 19, the length of the optical fiber corresponding to each grid is equal.

In the several embodiments provided in this application, it is understood that the disclosed device and method may be implemented in other manners. The described device embodiment is merely exemplary, for example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the schemes of the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of hardware and a software functional unit.

Those of ordinary skill in the art can understand: all or part of the steps in the above method embodiments can be performed by a program instructions relevant hardware. The above program can be stored in a computer readable storage medium. The steps included in the above method embodiments is executed, when the program is executed.

The invention claimed is:

1. A pulse testing method, comprising:
performing a pulse test on an optical fiber by using a plurality of pulses of different pulse widths respectively to obtain test data; and
fitting the test data corresponding to the plurality of pulses of different pulse widths;
wherein performing a pulse test on an optical fiber by using a plurality of pulses of different pulse widths respectively to obtain test data comprises:
performing a next pulse test by using a pulse of a pulse width smaller than that in a present pulse test to obtain test data in response to a scattering saturation index at a proximal end of the present pulse test failing to meet a predetermined condition;
further comprising:
determining a desired dynamic range of a test;
determining a dynamic range supported by a testing apparatus;
determining a required number of pulse widths according to the desired dynamic range and the dynamic range supported by the testing apparatus; and
selecting the pulse width of the pulse for the pulse test according to the number of the pulse widths.

2. The method of claim 1, wherein determining a required number of pulse widths according to the desired dynamic range and the dynamic range supported by the testing apparatus comprises calculating the required number of the pulse widths by the following formula:
I=INT (M*a/K)+1,
where I denotes the number of the pulse widths; M denotes the desired dynamic range; K denotes a maximum dynamic range supported by the testing apparatus; INT ( ) denotes rounded down; a denotes a redundancy factor which is a positive number not less than 1.

3. The method of claim 1, wherein selecting the pulse width of the pulse for the pulse test according to the number of the pulse widths comprises:
selecting a maximum pulse width supported by the testing apparatus in response to the number of the pulse widths being equal to 2; and
based on a scattering saturation range corresponding to the maximum pulse width, selecting a test range supported by the testing apparatus to cover a minimum pulse width in the scattering saturation range, wherein the scattering saturation range is a range in which the scattering saturation occurs at the proximal end.

4. The method of claim 1, wherein selecting the pulse width of the pulse for the pulse test according to the number of the pulse widths comprises the following steps of:
selecting the maximum and minimum pulse widths supported by the testing apparatus in response to the number of the pulse widths being greater than 2; and
selecting the remaining pulse width according to the scattering saturation range corresponding to the maximum pulse width and the test range of the minimum pulse width, wherein the scattering saturation range is a range in which the scattering saturation occurs at the proximal end, and a union of the test range of the remaining pulse width and that of the minimum pulse width is capable of covering the range in which the scattering saturation occurs at the proximal end corresponding to the maximum pulse width.

5. The method of claim 1, wherein performing a pulse test on an optical fiber by using a plurality of pulses of different pulse widths respectively to obtain test data comprises:
performing a plurality of pulse tests on the optical fiber by using the plurality of pulses of different pulse widths to obtain test data of each pulse test.

6. The method of claim 1, wherein fitting the test data corresponding to the plurality of pulses of different pulse widths comprises:
splicing the test data corresponding to the plurality of pulses of different pulse widths.

7. The method of claim 1, wherein fitting the test data corresponding to the plurality of pulses of different pulse widths comprises:
converting second test data according to a data format of first test data, wherein the first test data are the test data corresponding to a pulse of a first pulse width, the second test data are the test data corresponding to a pulse of a second pulse width, and the first pulse width is greater than the second pulse width; and
splicing the first test data and the converted second test data.

8. The method of claim 7, wherein converting second test data according to a data format of first test data comprises:
converting the second test data according to the following formula:

$$A(n), 1 \leq n \leq (2L*f)/v$$
$$B(n) = \sum_{i=1}^{I} A(n - m*(i-1))$$
$$I = T_1/T_2$$
$$m = f*T_2,$$

where A(n) denotes the second test data; B(n) denotes the converted second test data; I denotes the number of the pulses of the second pulse width required to be fitted into a pulse of the first pulse width; i denotes the serial number of the required pulse of the second pulse width; $T_1$ denotes the first pulse width; $T_2$ denotes the second pulse width; f denotes a sampling frequency; m denotes the number of sampling points of a pulse of the second pulse width; L denotes the length of the optical fiber; v denotes a propagation velocity of a test beam in the optical fiber; and n denotes the number of the second test data.

9. A testing apparatus, comprising: a memory in which a computer program is stored, and a processor;
wherein the processor is connected with the memory and configured to perform a pulse testing method by executing the computer program, the pulse testing method comprising:
performing a pulse test on an optical fiber by using a plurality of pulses of different pulse widths respectively to obtain test data; and
fitting the test data corresponding to the plurality of pulses of different pulse widths;
wherein performing a pulse test on an optical fiber by using a plurality of pulses of different pulse widths respectively to obtain test data comprises:
performing a next pulse test by using a pulse of a pulse width smaller than that in a present pulse test to obtain test data in response to a scattering saturation index at a proximal end of the present pulse test failing to meet a predetermined condition;

further comprising:

determining a desired dynamic range of a test;

determining a dynamic range supported by a testing apparatus;

determining a required number of pulse widths according to the desired dynamic range and the dynamic range supported by the testing apparatus; and selecting the pulse width of the pulse for the pulse test according to the number of the pulse widths.

10. A non-transitory computer storage medium in which a computer program is stored, wherein a pulse testing method is performed after the computer program is executed, the pulse testing method comprising:

performing a pulse test on an optical fiber by using a plurality of pulses of different pulse widths respectively to obtain test data; and fitting the test data corresponding to the plurality of pulses of different pulse widths;

wherein performing a pulse test on an optical fiber by using a plurality of pulses of different pulse widths respectively to obtain test data comprises:

performing a next pulse test by using a pulse of a pulse width smaller than that in a present pulse test to obtain test data in response to a scattering saturation index at a proximal end of the present pulse test failing to meet a predetermined condition;

further comprising:

determining a desired dynamic range of a test;

determining a dynamic range supported by a testing apparatus;

determining a required number of pulse widths according to the desired dynamic range and the dynamic range supported by the testing apparatus; and selecting the pulse width of the pulse for the pulse test according to the number of the pulse widths.

* * * * *